United States Patent [19]
Romig

[11] Patent Number: 5,009,300
[45] Date of Patent: Apr. 23, 1991

[54] ANTI-ROTATION DEVICE FOR THE RELEASE BEARING OF A MANUALLY OPERATED CLUTCH

[75] Inventor: Kenneth L. Romig, Rochester, Mich.

[73] Assignee: General Motors Corporation, Detroit, Mich.

[21] Appl. No.: 496,721

[22] Filed: Mar. 21, 1990

[51] Int. Cl.[5] .............................................. F16D 23/14
[52] U.S. Cl. ..................................... 192/98; 192/99 S
[58] Field of Search ...................... 192/98, 99 S, 110 B

[56] References Cited

U.S. PATENT DOCUMENTS

| | | | |
|---|---|---|---|
| 4,042,086 | 8/1977 | Ernst et al. ............................ | 192/98 |
| 4,403,685 | 9/1983 | Beccaris ................................. | 192/98 |

FOREIGN PATENT DOCUMENTS

| | | | |
|---|---|---|---|
| 2600386 | 12/1987 | France .................................... | 192/98 |
| 0137723 | 8/1982 | Japan ...................................... | 192/98 |
| 2177772 | 1/1987 | United Kingdom ............... | 192/99 S |
| WO88/04374 | 6/1988 | World Int. Prop. O. ............. | 192/98 |

*Primary Examiner*—Rodney H. Bonck
*Attorney, Agent, or Firm*—Donald F. Scherer

[57] ABSTRACT

An anti-rotation device for the clutch release mechanism in a pull-type manually operated clutch system. The device has a substantially planar body portion with first and second side flanges each having proximal end portions that are joined to the lateral edges of the body portion. A reaction cavity is defined between the laterally spaced, first and second side flanges so that at least one of the fingers presented from a throw fork may be cooperatively received within the reaction cavity when the throw fork is operatively positioned with respect to the clutch release bearing. A fastening clip is presented from the distal end portion of the second side flange embracingly to secure the first leg of a flange on the clutch release bearing—and the hook portion of the retainer which embraces the leg—between the second side flange and the engaging arm of the fastening clip. A blocking paddle portion extends outwardly from, and in coplanar relation with, the body portion of the anti-rotation device to interact with one of the fingers on the throw fork and thereby preclude rotation of the clutch release bearing, even when the throw fork has been displaced from within the reaction cavity to permit disassembly of the clutch for inspection and/or repair.

4 Claims, 4 Drawing Sheets

ANTI-ROTATION DEVICE FOR THE RELEASE BEARING OF A MANUALLY OPERATED CLUTCH

TECHNICAL FIELD

The present invention relates generally to manual clutch systems. More particularly, the present invention relates to a structural arrangement by which to preclude inadvertent and undesirable rotation of the nonrotatable portion of a clutch release bearing in a pull-type clutch system for the manual transmission of a vehicle.

Specifically, the present invention relates to a new and novel device by which to prevent the clutch release bearing in a pull-type clutch system for a manual transmission from inadvertently rotating when the throw fork which effects selective axial translation of the clutch release bearing is moved radially outwardly from its operating position relative to the clutch release bearing, as is the normal preliminary step in the disassembly of a clutch assembly for purposes of inspection and/or repair.

BACKGROUND OF THE INVENTION

A manual clutch system may be employed selectively to engage or disengage the crankshaft of an engine to the input shaft of a transmission, or, in a front wheel drive, to the input shaft of a transaxle. The principal parts of a typical manual clutch system for vehicles are the driving members, the driven members and the actuating members. The driving members generally present two opposed flat surfaces machined to a smooth finish. One of these smooth surfaces is presented from the flywheel that is secured to the crankshaft of the engine, and the other smooth surface is presented from a pressure plate. The pressure plate may be supported within a cover assembly that is bolted to the flywheel.

The driven members generally include a clutch plate which is operatively connected to the input shaft of the transmission or transaxle. In the majority of such clutch systems, the clutch plate is attached to the input shaft by means of a splined connection between the input shaft and the hub of the clutch plate which permits the hub to adjust its axial position freely along the input shaft and yet assures that the hub will always rotate with the input shaft.

The driving and driven members are normally held in driving contact by spring pressure. The spring pressure may be exerted by a plurality of compression springs or a single diaphragm spring, which is known to the art as a Belleville spring. In any event, the driven members are generally housed within a cover assembly.

The actuating members of a manual transmission normally include: a clutch pedal located for convenient operation by the operator of the vehicle; an assembly from which a throw fork is presented; a connecting means (mechanical and/or hydraulic) which operatively connects the clutch pedal to the throw fork; an adjusting mechanism to balance the desired movement of the throw fork in response to movement of the clutch pedal; and, a clutch release bearing that is supported from a quill which extends outwardly from the transmission or transaxle housing. The clutch release bearing is slidable axially along the quill in response to movement of the throw fork in order selectively to engage and disengage the clutch plate between the pressure plate and the flywheel.

As is known to the art, and as will be briefly hereinafter reviewed, there are two types of clutch systems—i.e. one that employs a push-type clutch assembly and another that employs a pull-type clutch assembly. In either type clutch assembly, the clutch release bearing must satisfy several design parameters. One design parameter for the release bearing is to assure that the driving engagement effected by the clutch assembly can be released with minimal lost motion of the clutch release bearing relative to its operative contact with both the throw fork and the pressure plate. As such, at least a portion of the release bearing preferably remains in constant contact with the diaphragm spring in preparation for the clutch release. In fact, a modest preload is generally applied to the clutch release bearing to maintain it firmly in contact with the diaphragm spring. As such, the continuous, operative contact between the clutch release bearing and the diaphragm spring requires that at least that portion of the clutch release bearing which contacts the diaphragm spring must be permitted to rotate at engine speed.

Conversely, that portion of the clutch release bearing which engages the supporting quill should not be permitted to rotate in order to simplify not only the interface between the clutch release bearing and the supporting quill but also the interface between the throw fork and the clutch release bearing. Irrespective of whether that portion of the clutch release bearing engaged by the throw fork is permitted to rotate, that same portion of the clutch release bearing must be permitted to slide axially and freely along the supporting quill in order to effect prompt release of the driving connection provided by the clutch, when desired.

Typically, the throw fork presents two fingers which embrace opposed flat engaging surfaces on the nonrotating portion of the clutch release bearing. The flat engaging surfaces are provided to preclude rotation of that portion of the clutch release bearing engaged by the throw fork as a result of the interaction between the fingers on the throw fork and the flat engaging surfaces. This construction is quite sufficient to preclude rotation of the nonrotating portion of the clutch release bearing during operation of the vehicle, but it is not per se adequate to preclude inadvertent rotation of the nonrotating portion of the clutch release bearing when the flat engaging surfaces are disengaged from the throw fork.

In push-type clutch systems, the release bearing is disposed in proximity to some portion of the clutch housing—such as the cover assembly—when the clutch is engaged. Hence, in a push-type clutch system the release bearing may be grounded to the housing member by virtue of a relatively uncomplicated arrangement when one is required to disassemble the clutch assembly. Once the clutch release bearing is grounded, the throw fork can be moved radially to disengage the fingers from the flat engaging surfaces on the release bearing, and that portion which should not rotate will not rotate. This arrangement assures that when the push-type clutch is re-assembled, the flat engaging surfaces on the nonrotating portion of the release bearing will be properly aligned to accept the fingers of the throw fork.

In a pull-type clutch system, however, the relative location of the release bearing with respect to the various other members in the clutch assembly do not readily permit the release bearing to be grounded. As a result, when working with pull-type clutches mechanics must be extremely careful to assure that the nonrotating portion of the clutch release bearing does not rotate when the fingers of the throw fork are disengaged therefrom.

SUMMARY OF THE INVENTION

It is, therefore, a primary object of the present invention to provide a structural arrangement by which to preclude rotation of that portion of the clutch release bearing engaged by the throw fork, even in a pull-type clutch assembly, when the throw fork is disengaged therefrom.

It is a another object of the present invention to provide a structural arrangement, as above, which prohibits rotation of that portion of the clutch release bearing which is engaged by the throw fork, even if the throw fork is inadvertently actuated while it is disengaged from the clutch release bearing.

It is a further object of the present invention to provide a device which embodies the foregoing structural arrangement and which: is relatively uncomplicated; is easily installed; and does not inhibit the normal operation of the clutch assembly with which the device is employed.

It is still a further object of the present invention to provide a device, as above, which can be readily adapted to be employed in conjunction with existing clutch release bearings without requiring structural modifications thereof.

It is yet another object of the present invention to provide a device, as above, which can, when operatively positioned on the nonrotating portion of a clutch release bearing, serve not only as the engaging means for the fingers of a throw fork but also as an anti-rotation means for the clutch release bearing when the throw fork is disengaged from the clutch release bearing to permit the required disassembly of the clutch for inspection and/or repair.

These and other objects of the invention, as well as the advantages thereof over existing and prior art forms, which will be apparent in view of the following detailed specification, are accomplished by means hereinafter described and claimed.

In general, an anti-rotation arrangement embodying the concepts of the present invention is employed in combination with a clutch release bearing. The anti-rotation arrangement has particular advantages for use in conjunction with pull-type clutch systems for manual transmissions, but the anti-rotation device disclosed herein may also be employed in conjunction with a push-type clutch system in order to avoid the necessity of providing means by which to ground the clutch release bearing when one disassembles the clutch assembly for inspection and/or repair.

Clutch release bearings normally include a rotating portion and a nonrotating portion. The nonrotating portion incorporates an outer race from which a radially outwardly extending flange means is presented. An anti-rotation device embodying the concepts of the present invention may be secured to the flange means. The anti-rotation device has a substantially planar body portion bounded by lateral edges. Axially spaced, first and second side flanges extend outwardly from the lateral edges of the body portion in substantially perpendicular relation with respect to the body portion and thereby define a reaction cavity between the side flanges. At least one finger of a throw fork is cooperatively received within the reaction cavity.

A fastening clip is presented from at least one of the side flanges on the anti-rotation device to embrace the flange means. A blocking paddle extends outwardly from, and in coplanar relation with, the body portion. At least one finger on the throw fork engages the blocking paddle to preclude the mounting portion of the release bearing from rotating, even when the finger has been radially displaced from within the reaction cavity, as required to disassemble the clutch for inspection and/or repair.

The present invention is described in conjunction with one exemplary embodiment of an anti-rotation device, and that embodiment is deemed sufficient to effect a full disclosure of the subject invention. The exemplary anti-rotation device is described in detail without attempting to show all of the various forms and modifications in which the invention might be embodied; the invention being measured by the appended claims and not by the details of the specification.

DESCRIPTION OF AN EXEMPLARY EMBODIMENT

Figure 1:
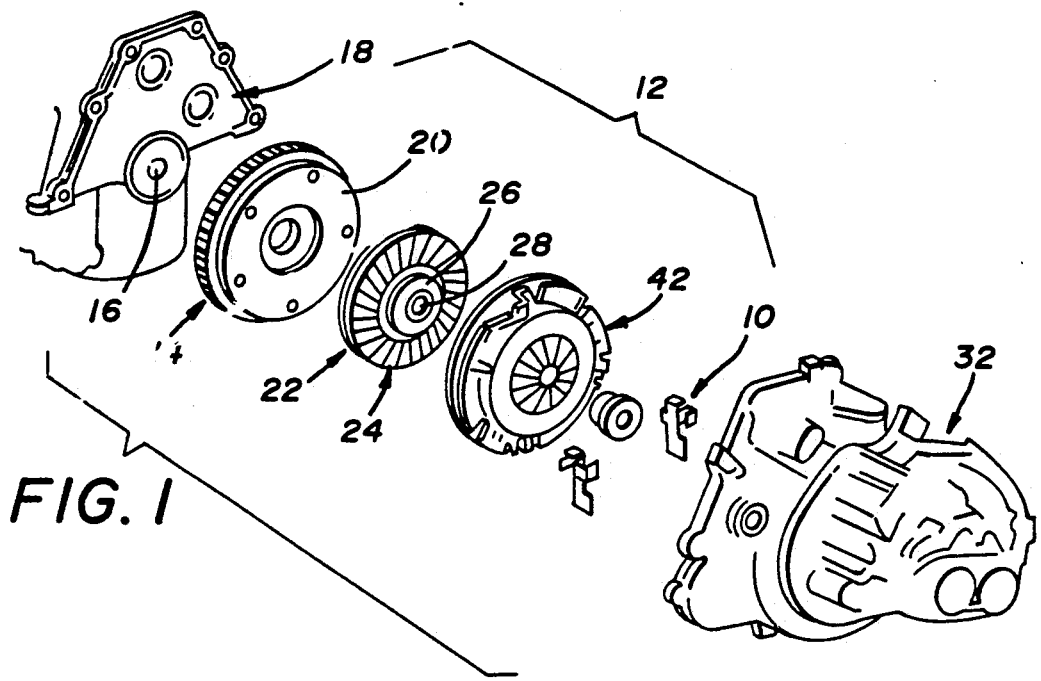
FIG. 1 is an exploded perspective of a pull-type clutch system incorporating an anti-rotation device embodying the conceptsof the present invention.

One representative form of an anti-rotation device embodying the concepts of the present intention is designated generally by the numeral 10 on the accompanying drawings. The representative anti-rotation device 10 is disclosed and discussed in conjunction with a typical dry plate clutch assembly identified generally by the numeral 12. A dry plate clutch assembly is the type generally employed in conjunction with manual transmissions for vehicles. A flywheel 14, which may be made of cast iron, is bolted, or otherwise secured, to one end of a crankshaft 16 presented from the engine 18. One side of the flywheel 14 presents a planar annulus which serves as a contact face 20. The contact face 20 is machined to a smooth finish in order to reduce unnecessary wear to the clutch plate 22.

The clutch plate 22 is a disk-like member having an outer planar friction contact ring portion 24 and a central hub portion 26. A bore 28 axially penetrates the hub portion 26 to receive the input shaft 30 (FIG. 2) of a transaxle 32. A driving connection may be effected between the clutch plate 22 and the input shaft 30 by a splined driving connection 34 between the interior of the bore 28 and the outboard end portion 36 of the input shaft 30. The friction contact ring portion 24 of the clutch plate 22 is typically secured to the hub portion 26 by means of a cushioning connection, identified generally by the numeral 38, which absorbs shock loading as the rotating flywheel 14 on engine 18 transfers torque to the input shaft 30 of the transaxle 32 through the clutch plate 22.

It should be noted that both sides of the friction contact ring portion 24 on the clutch plate 22 present a material 40 which preferably has a high coefficient of friction and yet exhibits low wear and heat resistance. Such materials 40 are well known to the art, and such materials are normally secured to the clutch plate 22 by a combination of rivets and bonding (not shown).

A cover assembly 42 may be secured, as by cap screws 44, to rotate with the flywheel 14. A pressure plate 46 is housed within the cover assembly 42. In the embodiment depicted, a diaphragm or Belleville spring 48 is disposed to cooperate with the cover assembly 42 and the pressure plate 46 in such a way as to drive the pressure plate 46 axially toward the contact face 20 on the flywheel 14 and thereby firmly capture the friction contact ring portion 24 of the clutch plate 22 therebetween. This disposition of the components heretofore described constitutes the "engaged" condition of the clutch.

When the clutch pedal (not shown) is depressed, a release bearing 50 moves axially along a supporting quill 54 which extends axially outwardly from the housing 56 of the transaxle 32. Axial translation of the clutch release bearing 50 not only releases the pressure applied by the diaphragm spring 48 but also disengages the pressure plate 46 from the friction contact ring portion 24 of the clutch plate 22. This disposition of the components constitutes the "disengaged" condition of the clutch. By so disengaging the clutch, the flywheel 14 may continue to rotate without effecting rotation of the clutch plate 22, and thereby also without effecting rotation of the input shaft 30. While the clutch plate 22 thus remains stationary, one may select the appropriate drive gear and then slowly release the clutch pedal to permit the clutch plate 22 to be gradually clamped between the flywheel 14 and the pressure plate 46 in order to reestablish a direct drive between the crankshaft 16 and the input shaft 30 of the transaxle 32.

In some clutch configurations the release bearing 50 is translated in one direction along the supporting quill 54 to disengage the clutch, and in other configurations, the release bearing 50 is translated in the opposite direction along the supporting quill 54 to disengage the clutch. Those arrangements wherein the release bearing 50 is moved axially toward the clutch plate 22 to disengage the clutch are designated as push-type clutches, and those arrangements wherein the release bearing 50 is moved axially away from the clutch plate 22 are designated as pull-type clutches. Because an anti-rotation device 10 affords particular advantages when used with pull-type clutch systems, the anti-rotation device 10 has been depicted, and described, in the environment of a pull-type, dry plate, clutch assembly 12.

Figure 3:
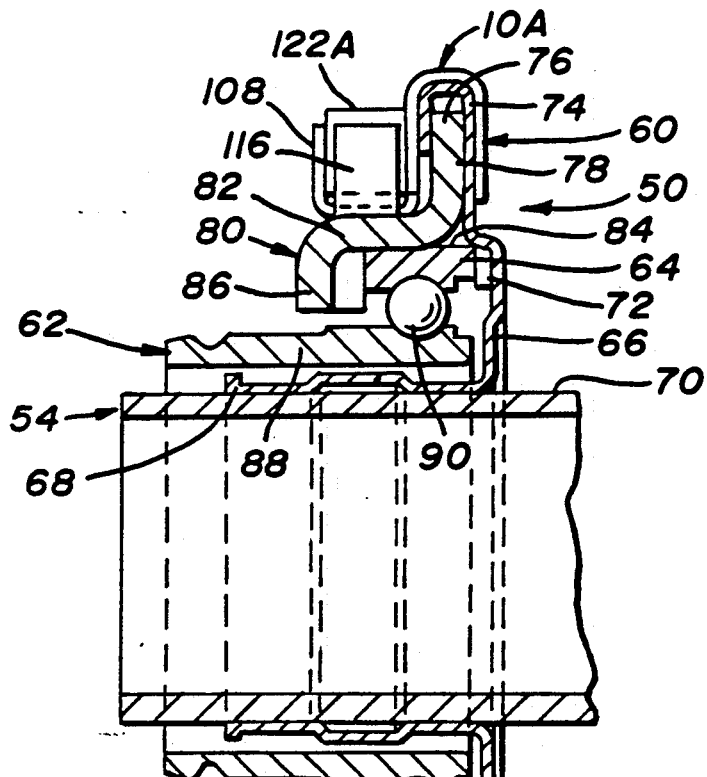
FIG. 3 is a further enlarged, horizontal section taken substantially along line 3—3 of FIG. 2 to depict the clutch release bearing to which a pair of anti-rotation devices embodying the concepts of the present invention have been operatively secured.

With particular reference, then, to FIG. 3, the clutch release bearing 50 has a nonrotating portion 60 and a rotating portion 62. The nonrotating portion 60 serves as the mounting portion of the clutch release bearing 50 and includes an outer race 64 that is operatively engaged by a retainer 66. The retainer 66 has an annular sleeve portion 68 which slidably engages the radially outer surface 70 of the supporting quill 54. A shield portion 72 extends radially outwardly from one end of the sleeve portion 68 and terminates in a hook portion 74 which opens downwardly to engage the outer end 76 on the radially disposed first leg 78 of a flange means 80.

Figure 2:
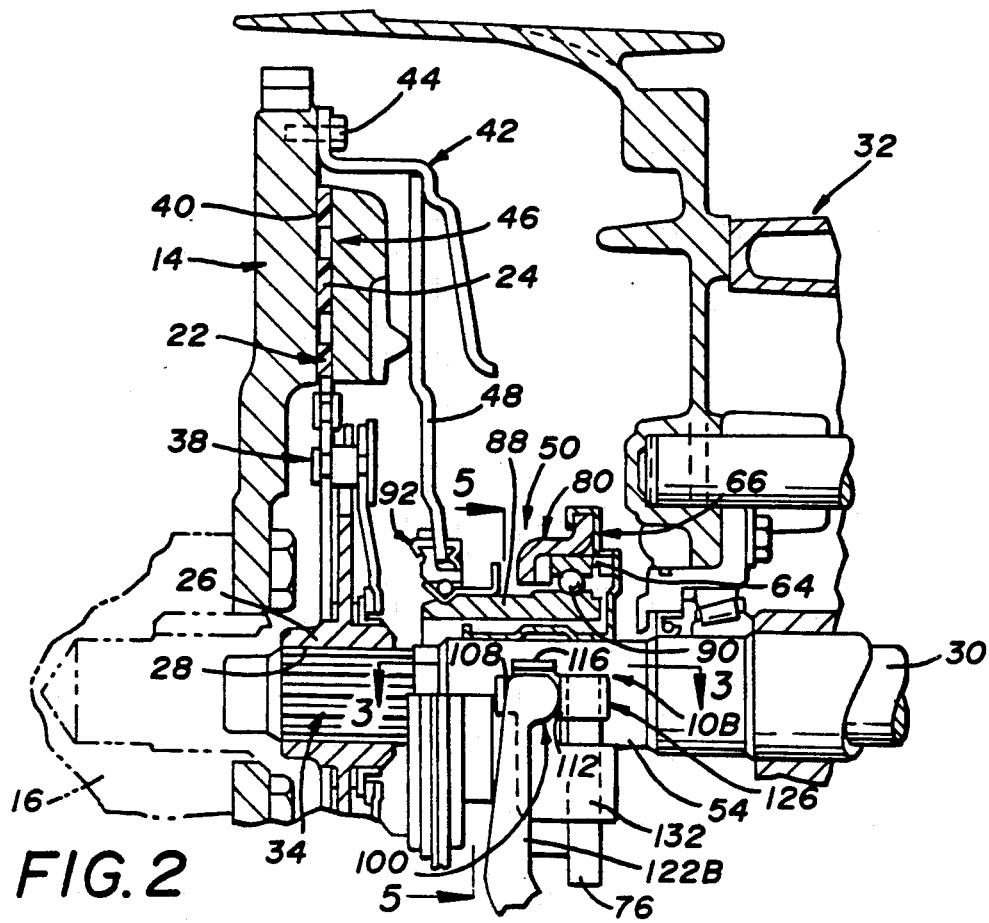
FIG. 2 is an enlarged, vertical cross section through an assembled, pull-type clutch system.

The flange means 80 is generally annular and may be of generally Z-shaped configuration. As such, the first leg 78 extends radially outwardly from one end of an annular body portion 82. The body portion 82 circumscribes and engages the radially outer surface 84 on the outer race 64. A second leg 86 extends radially inwardly from the opposite end of the body portion 82. When the hook portion 74 of the retainer 66 and the first leg 78 of the flange means 80 are interengaged, as depicted in FIGS. 2 and 3, the outer race 64 is captured between the second leg 86 of the flange means 80 and the shield portion 72 of the retainer 66. The configuration of the retainer 66 and the interaction between the retainer 66 and the flange means 80 may, therefore, serve to locate the sleeve portion 68, protect the hereinafter described bearings 90 and secure the outer race 64, and thereby indirectly the hereinafter described inner race 88, to their desired, relative positions.

The clutch release bearing 50 also includes an annular inner race 88 which serves as the rotating member thereof. A plurality of bearings 90 are interposed between the inner and outer races 88 and 64, respectively, to permit the inner race 88 to rotate freely with respect to the outer race 64. An attaching means 92 (FIG. 2) of the type well known to the art, effects the desired connection between the inner race 88 and the Belleville spring 48. One or more anti-rotation devices 10 may be employed to advantage in conjunction with the hereinbefore described pull-type, clutch assembly 12.

Figure 4:
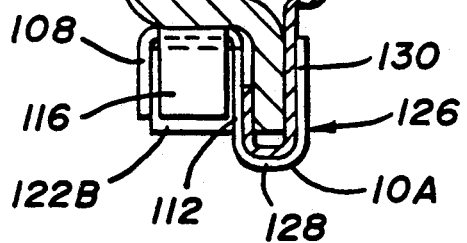
FIG. 4 is an enlarged perspective of the anti-rotation device depicted in the previous figures.
Figure 4:
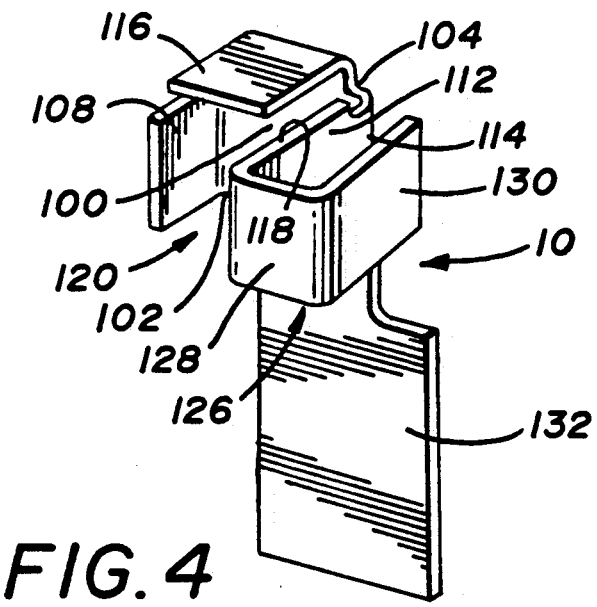

With reference particularly to FIGS. 3 and 4, it can be seen that each anti-rotation device 10 has a substantially planar body portion 100 having laterally spaced edges 102 and 104 with a transverse edge 106 extending therebetween. A first side flange 108 has a proximal end portion 110 that is joined to one lateral edge 102 of the body portion 100 and a second side flange 112 has a proximal end portion 114 that is joined to the second lateral edge 104 of the body portion 100. The side flanges 108 and 110 extend perpendicularly outwardly from the body portion 100. A reinforcing flange 116 extends perpendicularly outwardly from the transverse edge 106 of the body portion 100. A reaction cavity 120 is defined between said first and second side flanges 108 and 112 and said reinforcing flange 116 so that at least one of the fingers 122A or 122B presented from throw fork 124 (FIGS. 5 and 6) may be cooperatively received within the reaction cavity 120, as hereinafter more fully explained. The reinforcing flange 116 may, of course, serve as a stop to define the optimal position of the fingers 122A or 122B within the reaction cavity 120.

However, inasmuch as the anti-rotation device 10 may be fabricated from a relatively thin material, the flange 116 primarily serves as a reinforcing member to provide beam strength transversely of the body portion 100.

At least the side flange 112 has a distal end portion 118, and a fastening clip 126 is presented from the distal end portion 118. The fastening clip 126 may comprise a spacer 128 that extends laterally outwardly from the distal end portion 118 of the second side flange 112 to terminate in engaging arm 130 that extends parallel to the second side flange 112. The fastening clip 126 embracingly secures the first leg 78 of the flange means 80—and the hook portion 74 of the retainer 66 which embraces the first leg 78—between the second side flange 112 and the engaging arm 130.

Figure 6:
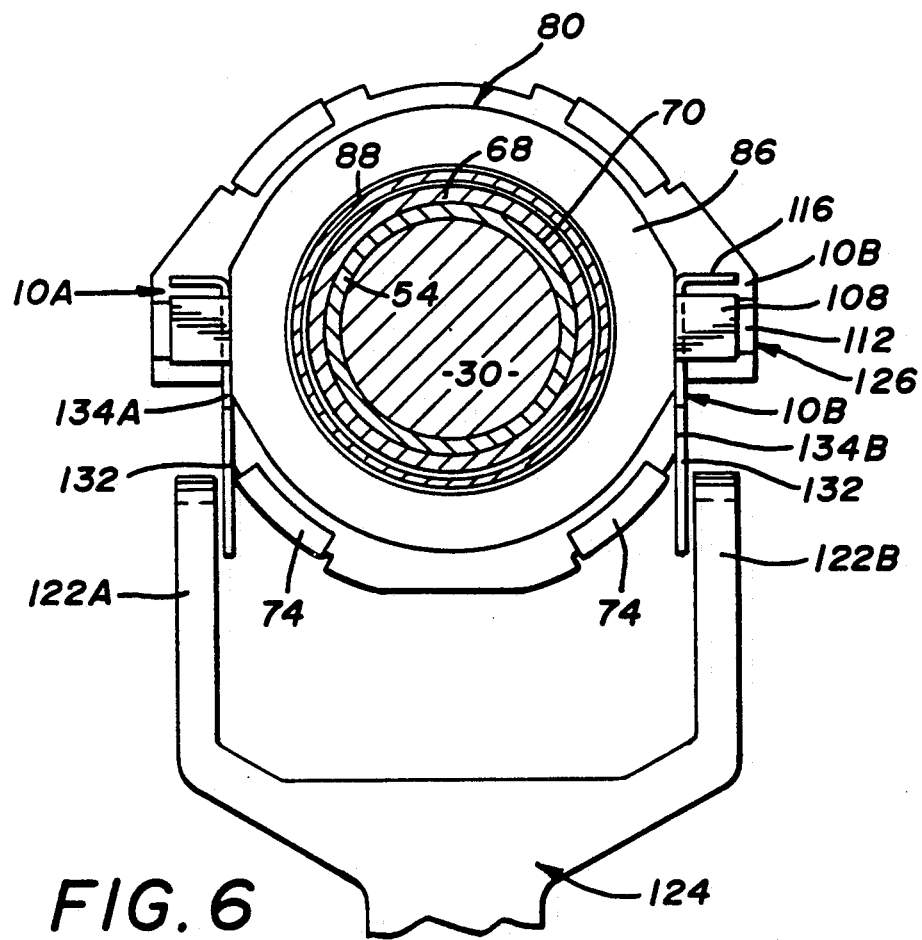
FIG. 6 is a view similar to FIG. 5 but depicting the relative disposition of the same components when the throw fork has been radially translated to disengage the fingers from the clutch release bearing to a sufficient degree to permit disassembly of the clutch and thereby to depict how the anti-rotation device continues to interact with the throw fork in order to preclude inadvertent, and undesirable, rotation of the clutch release bearing.

A blocking paddle portion 132 extends outwardly from and in coplanar relation with the body portion 100 of the anti-rotation device 10 to be engaged by the fingers 122A and/or 122B on the throw fork 124 and thereby preclude rotation of the clutch release bearing 50, even when the throw fork 124 has been radially displaced to disengage the fingers 122A and 122B from within the reaction cavities 120, as represented in FIG. 6.

Figure 5:
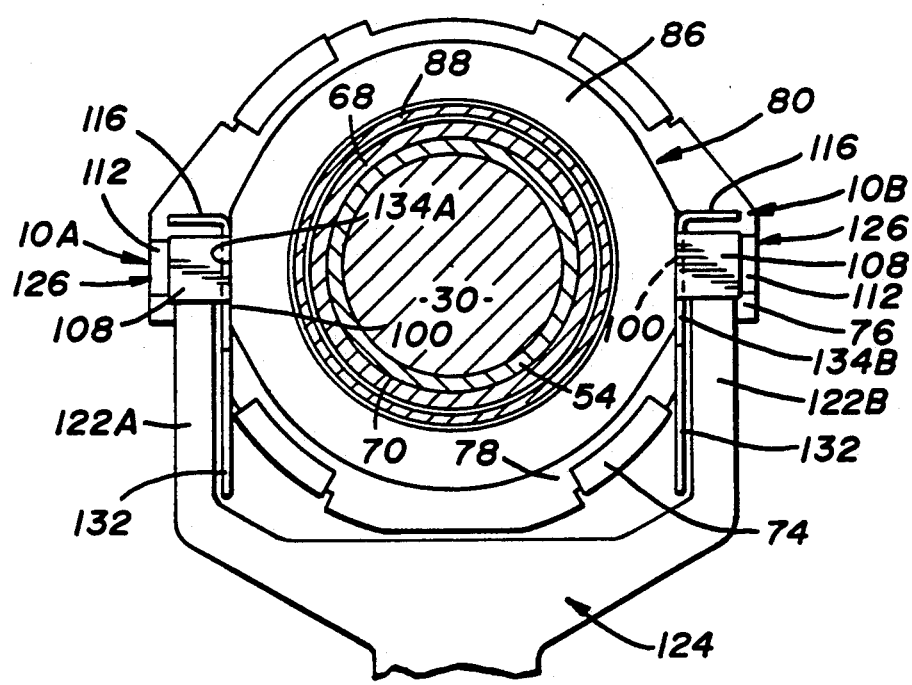
FIG. 5 is a further enlarged, vertical section taken substantially along line 5—5 of FIG. 2 to depict the disposition of the fingers on the throw fork relative to the release bearing and the anti-rotation device mounted the when the throw fork is disposed in its operative position.

As depicted in FIG. 5, a pair of anti-rotation devices 10A and 10B are received on opposite sides of the clutch release bearing 50. As such, the fastening clip 126 on each device 10A and 10B is secured to the first leg 78 of the flange means 80, and the planar body portion 100 on each device 10A and 10B is disposed in contiguous juxtaposition with the flat, engaging surfaces 134A and 134B on the flange means 80. One may rely on the frictional engagement of the fastening clip 126 to maintain the devices 10A and 10B properly disposed on the clutch release bearing 50. However, one may, if desired, spot weld or otherwise secure the fastening clip 126 to the first leg 78 of the flange means 80.

Figure 7:
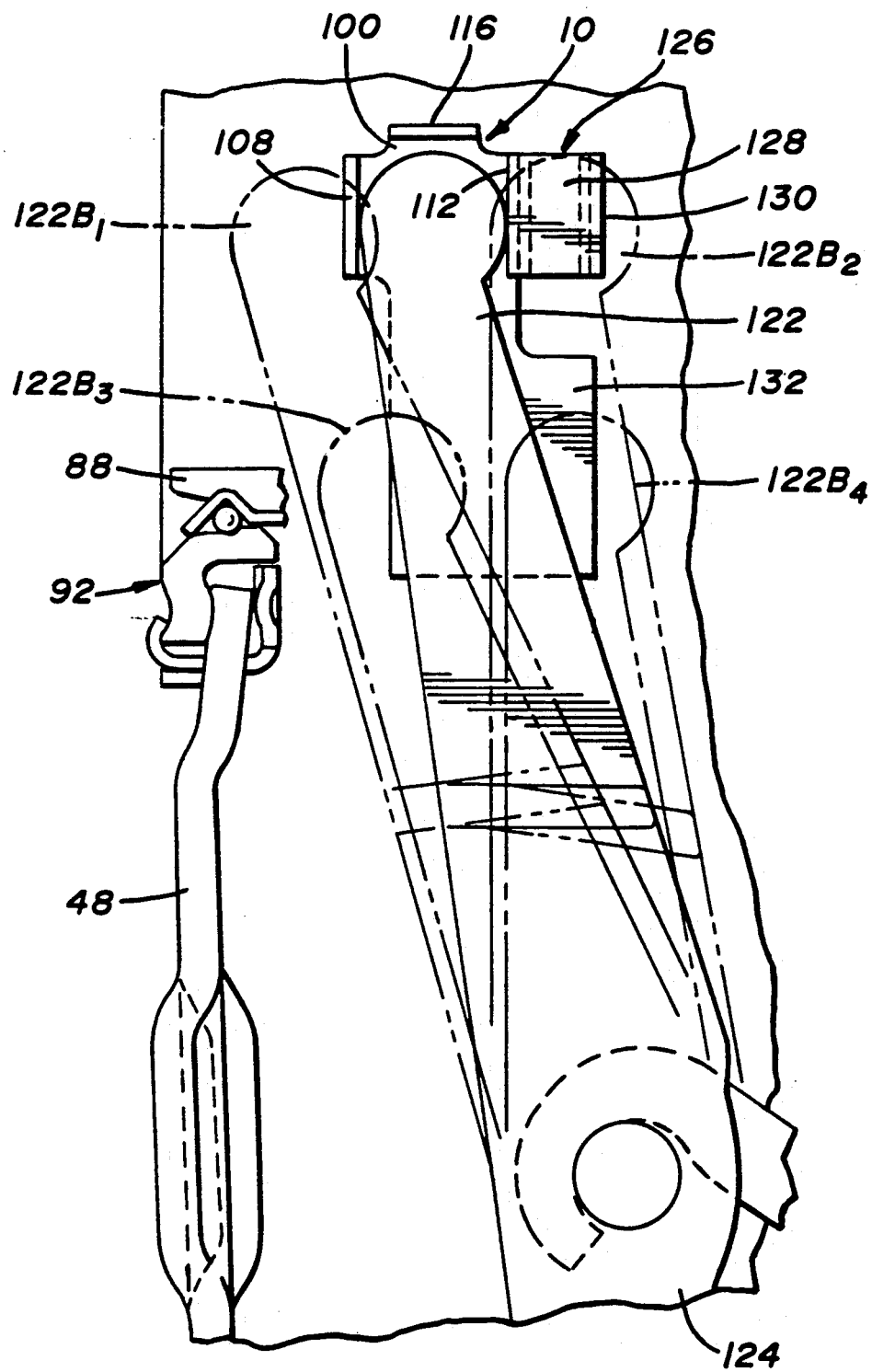
FIG. 7 is a further enlarged side elevation schematically depicting a throw fork and the anti-rotation device shown in FIG. 4, mounted on the clutch release bearing in a pull-type clutch system and representing the interactive range of movement between the throw fork and the clutch release bearing not only when the shift fork is positioned operatively to translate the clutch release bearing but also when the shift fork has been radially displaced to permit that disassembly of the clutch assembly required for inspection and/or repair thereof.

In either event, the laterally spaced fingers 122A and 122B are received within the reaction cavities 120 of the respective devices 10A and 10B. With the fingers 122A and 122B disposed to embrace the opposed engaging surfaces 134A and 134B, respectively, the nonrotating portion 60 of the clutch release bearing 50 is maintained against rotation. However, the clutch release bearing 50 may be axially translated, as desired, along the supporting quill 54 through a range identified by the axially spaced, terminal positions of the fingers, as depicted by the chainline representational positions 122B$_1$ and 122B$_2$ in FIG. 7. In short, this is the range through which the clutch release bearing 50 may be axially translated in response to the actuating movement of the throw fork 124 when it is operatively disposed with respect to the clutch release bearing 50. The continuous disposition of the fingers 122A and 122B in radially outward juxtaposition with respect to the opposed, flat, engaging surfaces 134A and 134B precludes the nonrotating portion 60 of the clutch release bearing 50 from rotating.

Disassembly of the clutch, as would be necessary for inspection and/or repair, requires that the throw fork 124 be radially translated to displace the fingers 122A and 122B from their radially outward juxtaposition relative to the flat, engaging surfaces 134A and 134B. The necessary displacement of the fingers 122A and 122B with respect to the clutch release bearing 50 is depicted in FIG. 6. Without the presence of the devices 10A and/or 10B the nonrotating portion 60 of the clutch release bearing 50 could turn sufficiently so that the flat engaging surfaces 134A and 134B would be disposed to prevent re-engagement by the fingers after the clutch were reassembled. However, by employing the anti-rotation devices 10A and 10B, the blocking paddle portions 132 engage the respective fingers 122A and 122B, and thereby preclude the nonrotating portion 60 from inadvertently rotating.

With reference once again to FIG. 7, it can be seen that the clutch release bearing 50 may be axially translated along the supporting quill 54 through a range identified by the chainline representations of the fingers disposed at positions 122B$_3$ and 122B$_4$ in FIG. 7. This is the full range through which the throw fork 124 may be swung when the throw fork has been radially displaced to permit disassembly of the clutch assembly 12. Thus, the continuous interface between the fingers 122A and 122B and the blocking paddle portions 132A and 132B continues to preclude the nonrotating portion 60 of the clutch release bearing 50 from rotating, even when the throw fork has been radially displaced to permit disassembly of the clutch assembly 12.

As should now be apparent, the present invention not only teaches that an anti-rotating device embodying the concepts of the present invention precludes rotation of that portion of the clutch release bearing engaged by the throw fork—even in a pull-type clutch assembly and even when the throw fork is disengaged therefrom—but also that the other objects of the invention can likewise be accomplished.

The embodiments of the invention in which an exclusive property or privilege is claimed are defined as follows:

1. A device adapted to establish a cooperative interface between at least one finger of a clutch throw fork and the mounting portion of a release bearing in a clutch assembly, one or more of the devices being mounted at selected locations along the circumference of a flange means extending radially outwardly from the mounting portion of the clutch release bearing, said device comprising: a substantially planar body portion having lateral edges with a transverse edge extending therebetween; first and second side flanges extending substantially perpendicularly outwardly from the lateral edges of said body portion to define a reaction cavity therebetween; at least one finger of a throw fork being cooperatively received within said reaction cavity; fastening clip means secured to at least one of said side flanges to embrace the flange means extending outwardly from the mounting portion of the clutch release bearing; and, a blocking paddle portion extending outwardly from, and in coplanar relation with, said body portion to engage the finger means on the throw fork and thereby serve to preclude rotation of the mounting portion on the release bearing even when the throw fork has been displaced from within said reaction cavity.

2. A device adapted to establish a cooperative interface between at least one finger of a clutch throw fork and the mounting portion of a release bearing in a clutch assembly, one or more of the devices being mounted at selected locations circumferentially along a flange means extending radially outwardly from the mounting portion of the clutch release bearing, said device comprising: a substantially planar body portion having laterally spaced edges with a transverse edge extending therebetween; first and second side flanges; said side flanges each having a proximal end portion; at least said first side flange having a distal end portion; said proximal end portion on said side flanges being secured to the respective, laterally spaced edges on said body portion;

a reaction cavity defined between said sided flanges, at least one finger of a throw fork being cooperatively received within said reaction cavity; a spacer extending laterally outwardly from the distal end portion of said first side flange; an engaging arm presented from said spacer and extending parallel to said first side flange embracingly to secure the flange means extending outwardly from the mounting portion of the clutch release bearing and sandwiched between said first side flange and said engaging arm; and, a blocking paddle portion extending outwardly from, and in coplanar relation with, said body portion to engage the finger means on the throw fork and thereby serve to preclude rotation of said mounting portion in the release bearing even when the throw fork has been radially displaced from within said reaction cavity.

3. A device, as set forth in claim 2, further comprising: a reinforcing flange extending outwardly from said body portion along said transverse edge and cooperating with said first and second side flanges further to define said reaction cavity.

4. An anti-rotation device in combination with the clutch release bearing of a pull-type clutch means for a manual transmission comprising: a clutch release bearing having a nonrotating, mounting portion with a rotating portion supported from said mounting portion; a flange means extending radially outwardly from said mounting portion; a fastening clip embracingly secured to said mounting flange; a first side flange presented from said fastening clip; a second side flange presented from a body plate secured to said first side flange, said second side flange being disposed in spaced parallel relation with respect to said first side flange to define a reaction cavity between said first and second side flanges; a throw arm having finger means; said finger means received within said reaction cavity; a blocking paddle extending outwardly from, and in coplanar relation with, said body plate to engage said finger means and thereby preclude rotation of said mounting portion on the release bearing, even when said finger means have been radially displaced from within said reaction cavity.

* * * * *